US008808871B2

(12) United States Patent
Kinoshita et al.

(10) Patent No.: US 8,808,871 B2

(45) Date of Patent: Aug. 19, 2014

(54) ROTATION TOOL

(75) Inventors: Hideyoshi Kinoshita, Kagoshima (JP); Katsuhiro Hanaki, Satsumasendai (JP)

(73) Assignee: Kyocera Corporation, Kyoto (JP)

( * ) Notice: Subject to any disclaimer, the term of this patent is extended or adjusted under 35 U.S.C. 154(b) by 2 days.

(21) Appl. No.: 13/512,301

(22) PCT Filed: Nov. 26, 2010

(86) PCT No.: PCT/JP2010/071099

§ 371 (c)(1), (2), (4) Date: May 25, 2012

(87) PCT Pub. No.: WO2011/065468

PCT Pub. Date: Jun. 3, 2011

(65) Prior Publication Data

US 2012/0263944 A1 Oct. 18, 2012

(30) Foreign Application Priority Data

Nov. 26, 2009 (JP) ................................ 2009-268218
Jan. 23, 2010 (JP) ................................ 2010-012657

(51) Int. Cl.

| | |
|---|---|
| ***B23B 5/14*** | (2006.01) |
| ***B21D 39/00*** | (2006.01) |
| ***B32B 15/04*** | (2006.01) |
| ***B32B 19/00*** | (2006.01) |
| ***B24D 3/02*** | (2006.01) |
| ***B23P 15/28*** | (2006.01) |
| ***C22C 29/02*** | (2006.01) |
| ***B22F 3/10*** | (2006.01) |

(52) U.S. Cl.

CPC ................. *B22F 3/101* (2013.01); *C22C 29/02* (2013.01); *B23C 2222/16* (2013.01); *B22F 3/1017* (2013.01); *B23B 2222/16* (2013.01); *B22F 2999/00* (2013.01); *B22F 2203/11* (2013.01); *B22F 2207/01* (2013.01)

USPC ........... 428/610; 428/622; 428/627; 428/660; 428/698; 51/307; 51/309; 407/119

(58) Field of Classification Search

None

See application file for complete search history.

(56) References Cited

FOREIGN PATENT DOCUMENTS

| | | | |
|---|---|---|---|
| EP | 2 177 639 | | 4/2010 |
| JP | 5098382 | | 4/1993 |
| JP | 7041898 | | 2/1995 |
| JP | 2009-108338 | * | 5/2009 |
| JP | 2009108338 | | 5/2009 |
| JP | 2009228085 | | 10/2009 |
| WO | 2009/017053 | | 2/2009 |

* cited by examiner

*Primary Examiner* — Gwendolyn Blackwell

*Assistant Examiner* — Seth Dumbris

(74) *Attorney, Agent, or Firm* — Schlee IP International, P.C.; Alexander R. Schlee

(57) ABSTRACT

A sintered cermet of a rotary tool has a hard phase with a first hard phase and a second hard phase comprising a carbide, a nitride, and a carbonitride of at least one of group 4, 5, and 6 metals of the periodic table of which metals the metal titanium is a main component. The result of an X-ray diffraction measurement in a surface region of the sintered cermet provides a first peak intensity Ib on a high angle side that is attributable to a (220) plane of the first hard phase and a second peak intensity Ia on a low-angle side that is attributable to a (220) plane of the second hard phase, and an intensity ratio Ib/Ia of the first peak intensity Ib to the second peak intensity Ia is in the range of 0.5 to 1.5.

6 Claims, 4 Drawing Sheets

X-ray diffraction patterns of surfaces of sintered cermets

X-ray diffraction patterns of inside of sintered cermets

ROTATION TOOL

CROSS-REFERENCE TO RELATED APPLICATIONS

This application is a national phase of the International Patent Application PCT/JP2010/071099 filed on Nov. 26, 2010 that claims the priority from Japanese patent applications 2009-268218 filed on Nov. 26, 2009, titled "ROTATION TOOL" and 2010-012657 filed on Jan. 23, 2009, titled "ROTATION TOOL". The content of these aforementioned documents is herewith incorporated by reference in its entirety.

BACKGROUND OF THE INVENTION

The present invention relates to rotary tools made of a cermet sintered body.

BACKGROUND ART

Currently, sintered alloys such as cemented carbide containing WC as a main component and a sintered cermet containing Ti as a main component are widely used as members that require wear resistance, sliding performance, or chipping resistance such as a cutting tool, a wear-resistant member, and a sliding member. However, it has been believed that sintered cermets are not suitable for a rotary tool because their thermal shock resistance and plastic deformation resistance are low, though sintered cermets have a high hardness.

For example, a known cermet includes a hard phase containing I-type grains mainly composed of TiCN and II-type grains composed of TiCN to which WC and TaC are added, wherein the I-type grains have a two-group distribution of fine crystal grains and coarse crystal grains, has good wear resistance, thermal shock resistance, and plastic deformation resistance and can be used as a rotary tool.

Furthermore, impact resistance on a surface of a cermet may be improved by forming a surface region where the abundance ratio of a black first hard phase is higher than the abundance ratio of a grayish white second hard phase on the surface of the cermet.

However, it was found that, thermal shock resistance of the cermet as a rotary tool is not sufficiently improved and it is necessary to further improve thermal shock resistance in order to use the cermet as a rotary tool. Furthermore, the amount of deformation of cermets due to firing tends to be larger than that of cemented carbide. Accordingly, in the case where a rotary tool composed of a cermet and having a complicated shape is prepared, the position and the shape of cutting edges vary depending on the corners to be used, resulting in a problem that, for example, a dimension varies in machining.

The present invention has been made in order to solve the above problem, and an object of the present invention is to provide a rotary tool which has improved thermal shock resistance and which achieves a high machining accuracy by reducing deformation due to firing.

SUMMARY OF THE INVENTION

According to a first aspect of the present invention, a rotary tool is composed of a sintered cermet that includes a hard phase and a binding phase. The hard phase includes a carbide, a nitride, and a carbonitride of at least one of group 4, 5, and 6 metals of the periodic table of which titanium is a main component. The hard phase includes: a first hard phase in which a content of Ti is the highest among contents of the at least one of group 4, 5, and 6 metals of the periodic table; and a second hard phase having a higher content ratio of a content of the at least one of group 4, 5, and 6 metals of the periodic table other than Ti than the content ratio in the first hard phase. The binding phase is mainly composed of at least one of Co and Ni. The sintered cermet further includes a surface region that mainly includes the first hard phase is present in a thickness range of 1 to 10 μm in a scanning electron microscopic observation of an arbitrary cross section including a surface of the sintered cermet. When an X-ray diffraction measurement is conducted on a surface of the sintered cermet, peaks attributable to a (220) plane of the hard phase are detected as two peaks on the low-angle side and on the high-angle side, and an intensity ratio of a peak intensity (Ib) of the peak on the high-angle side to a peak intensity (Ia) of the peak on the low-angle side satisfies Ib/Ia=0.5 to 1.5.

According to a second aspect of the present invention a rotary tool is composed of a sintered cermet that includes a hard phase and a binding phase. The hard phase includes a carbide, a nitride, and a carbonitride of at least one of group 4, 5, and 6 metals of the periodic table of which titanium is a main component. The hard phase includes: a first hard phase in which a content of Ti is the highest among contents of the at least one of group 4, 5, and 6 metals of the periodic table; and a second hard phase having a higher content ratio of a content of the at least one of group 4, 5, and 6 metals of the periodic table other than Ti than the content ratio in the first hard phase. The binding phase is mainly composed of at least one of Co and Ni. Peaks attributable to a (220) plane of the hard phase are detected as two peaks on the low-angle side and on the high-angle side, an intensity ratio Ib/Ia of a peak intensity Ib of the peak on the high-angle side to a peak intensity Ia of the peak on the low-angle side is 0.5 to 1.5, and a ratio (ws/wi) of a half-width ws of a peak attributable to a (200) plane of the binding phase on the surface of the sintered cermet to a half-width wi of the peak of the binding phase in the inside of the sintered cermet is 1.1 to 1.7 when an X-ray diffraction measurement is conducted on a surface of the sintered cermet.

According to the rotary tool of the present invention, because of the presence of the above surface structure, a surface state of a sintered cermet can be made to be a proper state suitable for use as a rotary tool to provide a rotary tool having high thermal shock resistance, and the amount of deformation of the sintered cermet due to firing can be reduced to provide a rotary tool that achieves a high dimensional accuracy of machining.

BRIEF DESCRIPTION OF THE DRAWINGS

FIGS. 1(A)-1(C) shows microscopic images of a partial cross section close to the surface of sintered cermet of the rotary tool of and embodiment of the present invention, namely 1(A) Example No. I-2, 1(B) Example No. I-7, and 1(C) Example No. I-5.

DETAILED DESCRIPTION OF THE DRAWINGS

An example of a rotary tool according to a first embodiment of the present invention will now be described with referring to scanning electron micrographs (SEM) of FIGS. 1 and 2 and X-ray diffraction patterns of FIGS. 3 and 4.

The rotary tool of the present invention is composed of a sintered cermet 1 that includes a hard phase 2 and a binding phase 3. The hard phase includes a carbide, a nitride, and a carbonitride of at least one of group 4, 5, and 6 metals of the periodic table of which titanium is a main component. The hard phase 2 includes: a first hard phase 2*a* in which a content of Ti is the highest among contents of the at least one of group 4, 5, and 6 metals of the periodic table; and a second hard phase 2*b* having a higher content ratio in the second phase of a content of the at least one of group 4, 5, and 6 metals of the periodic table other than Ti than the content ratio in the first hard phase 2*a*. The binding phase 3 is mainly composed of at least one of Co and Ni.

Figure 1:
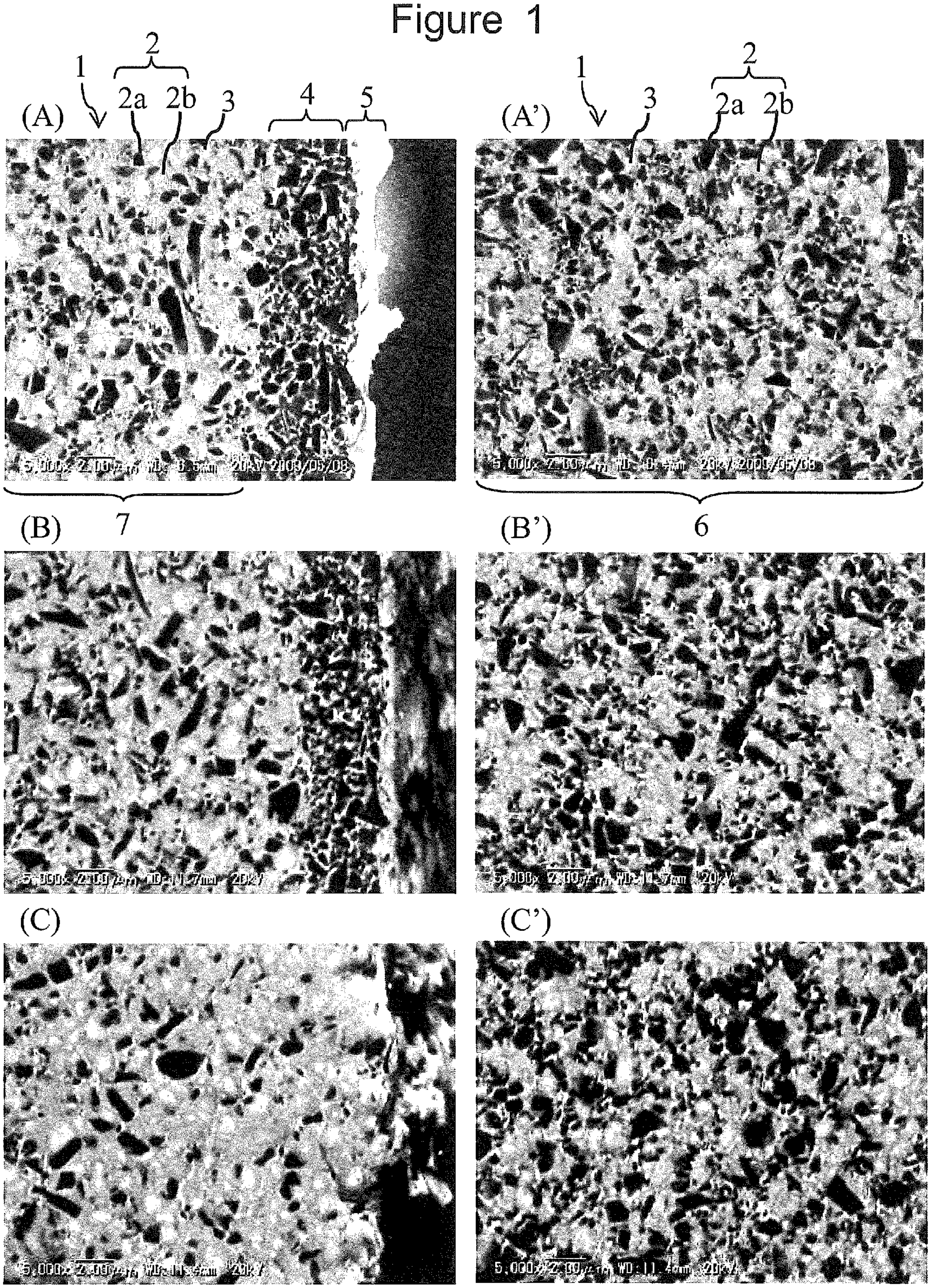
FIGS. 1(A')-1(C') shows microscopic images of a partial cross section deeper inside the sintered cermet of the rotary tool of an embodiment of the present invention, namely 1(A') Example No. I-2, 1(B') Example No. I-7, and 1(C') Example No. I-5.
Figure 2:
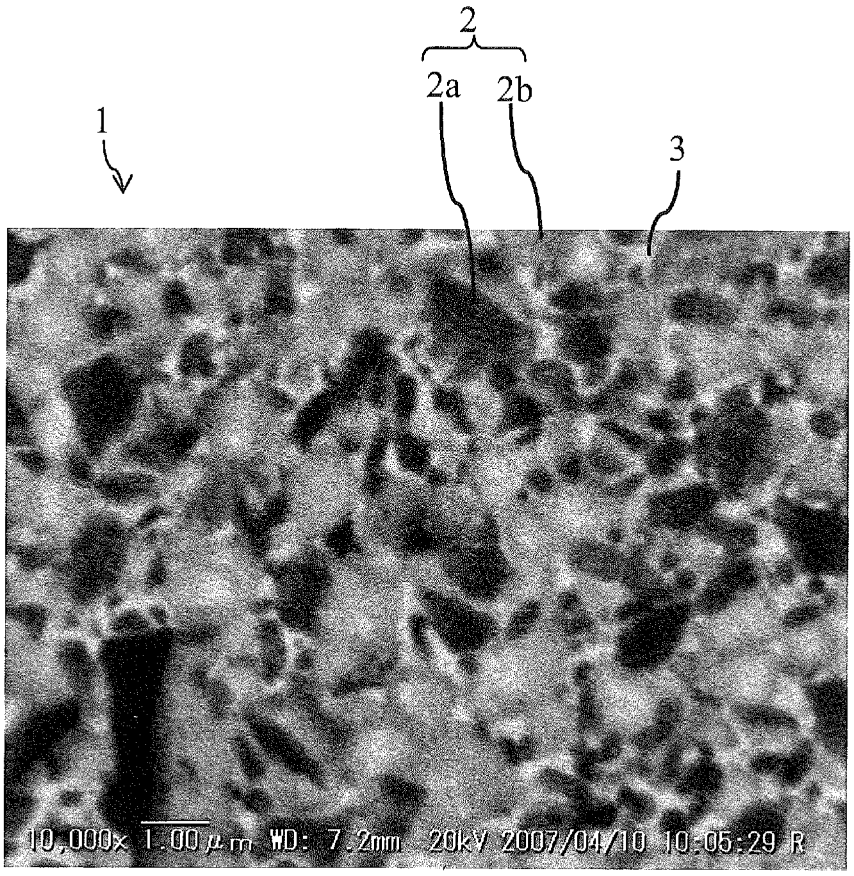
FIG. 2 is an enlarged microscopic image of a part of the image 1(A') of an embodiment of the sintered cermet in FIG. 1.

In a scanning electron microscopic (SEM) observation of an arbitrary cross section including a surface of the sintered cermet 1, as shown in FIGS. 1 and 2, the first hard phase 2*a* is observed as a black grain, the second hard phase 2*b* is observed as a grayish white grain, and the binding phase 3 is observed as a white.

According to the first embodiment, as shown in FIG. 1 (A), a surface region 4 that mainly contains the first hard phase 2*a* is present in a thickness range of 1 to 10 μm. Furthermore, as shown in FIG. 3 (A), when an X-ray diffraction measurement is conducted on a surface of the sintered cermet 1, peaks (diffraction angle 2θ=60° to 63°) attributable to a (220) plane of the hard phase 2 are detected as two peaks of a peak on a low-angle side ((1) of FIG. 3) and a peak on a high-angle side ((2) of FIG. 3), and an intensity ratio of a peak intensity (Ib) of the peak detected on the high-angle side to a peak intensity (Ia) of the peak detected on the low-angle side satisfies Ib/Ia=0.5 to 1.5. Accordingly, a surface state of the sintered cermet 1 can be made to be a proper state suitable for use as a rotary tool to provide a rotary tool having high wear resistance and high chipping resistance, and the amount of deformation of the sintered cermet 1 due to firing can be reduced to provide a rotary tool having a high machining accuracy. The thickness of the surface region 4 is preferably in the range of 3 to 6 μm. The Ib/Ia ratio in the surface region 4 is preferably in the range of 0.5 to 1.0 and particularly preferably in the range of 0.7 to 0.95.

Considering the mass of elements and the atomic radius, it is assumed that, out of the peaks attributable to the (220) plane in the X-ray diffraction measurement, the peak on the high-angle side corresponds to the first hard phase 2*a* and the peak on the low-angle side corresponds to the second hard phase 2*b*. In addition, in the case where the X-ray diffraction measurement is conducted in the inside of the sintered cermet 1, as shown in FIG. 4 (A') to (C'), the ratio of the peak on the high-angle side ((2) of FIG. 4) to the peak on the low-angle side ((1) of FIG. 4) attributable to the (220) plane of the hard phase 2 is substantially the same among samples of FIG. 1 (A') to (C') (sintered cermets of No. I-2, No. I-7, and No. I-5 of Examples described below). The Ib/Ia ratio in an inner part 6 is preferably in the range of 0.4 to 0.6 from the standpoint of wear resistance and suppression of deformation due to firing.

From the standpoint of improving thermal shock resistance, a top surface layer 5 formed by exudation of the binding phase 3 on the surface and having a high concentration of the binding phase 3 is preferably present on the surface of the surface region 4 of the sintered cermet 1. The top surface layer 5 may cover the entire portion of the surface region 4 of the sintered cermet 1 or may partially cover a portion of the surface region 4.

Furthermore, according to the present invention, the total content of the nitride or the carbonitride of at least one of group 4, 5, and 6 metals of the periodic table in the composition of the sintered cermet 1 is preferably 70% to 96% by mass, and particularly preferably 85% to 96% by mass from the standpoint of improving wear resistance. In addition, the content of Ti in the nitride or the carbonitride of the at least one of group 4, 5, and 6 metals of the periodic table is preferably 50% by mass or more and particularly preferably 60% to 90% by mass from the standpoint of the balance between the hardness and the toughness of the sintered cermet 1. On the other hand, the content of the binding phase 3 is preferably 4% to 30% by mass and particularly preferably 10% to 15% by mass, thereby achieving a good balance between the hardness and the toughness of the sintered cermet 1. A specific composition of the sintered cermet 1 preferably contains 5% to 15% by mass of Co, 2% to 10% by mass of Ni, 40% to 70% by mass of TiCN, 5% to 30% by mass of WC, 5% to 30% by mass of NbC, 1.0% to 3.0% by mass of VC, 0% to 5% by mass of MoC, 0% to 10% by mass of TaC, and 0% to 3.0% by mass of ZrC. In this case, both wear resistance and chipping resistance of the sintered cermet 1 can be achieved.

The X-ray diffraction measurement in the present invention is first conducted on a surface of the sintered cermet 1 under the measurement conditions of a radiation source of CuKα (Kα2 is removed), a spot diameter of 100 μm or less, an output of 40 kV and 40 mA, a step of 0.016°, and measurement peaks of a TiN (220) crystal plane (detected at a diffraction angle 2θ of about 60° to 65°). In the case where an X-ray diffraction measurement is subsequently conducted in the inside of the sintered cermet 1, the measurement is conducted on a polished surface prepared by polishing the sintered cermet 1 by 0.5 mm or more from the surface of the sintered cermet 1.

Regarding the average grain size of the hard phase 2, in the observation of a cross section in the inside of the sintered cermet 1, the average grain size of the first hard phase 2*a* is preferably in the range of 0.3 to 0.7 μm, and the average grain size of the second hard phase 2*b* is preferably in the range of 0.8 to 1.5 μm from the standpoint that the toughness can be increased. The grain size of the hard phase in the present invention is measured in accordance with the method for measuring an average grain size of cemented carbide specified in CIS-019D-2005. In this measurement, in the case where a grain of the hard phase 2 has a core-rim structure including a core composed of the first hard phase 2*a* and a peripheral part surrounding the core and composed of the second hard phase 2*b*, the grain size of the first hard phase 2*a* of the grain is calculated as the grain size of the first hard phase 2*a* itself, and the grain size of the second hard phase 2*b* of the grain is calculated on the assumption that an area including the first hard phase 2*a* that constitutes the core part and the second hard phase 2*b* that constitutes the peripheral part and extending to the outer edge of the peripheral part is considered to be a single hard phase 2.

From the standpoint of improving plastic deformation resistance, an intermediate region 7 having an average grain size of the hard phase 2 larger than that of the inner part 6 is preferably present between the surface region 4 shown in FIG. 1 (A) and the inner part 6 shown in FIG. 1 (A') with a thickness of 10 to 200 μm. Regarding the average grain size of the hard phase 2 in the observation of a cross section of the intermediate region 7, the average grain size of the first hard phase 2*a* is preferably in the range of 0.5 to 1.0 μm, and the average grain size of the second hard phase 2*b* is preferably in the range of 1.0 to 2.5 μm.

Furthermore, a residual stress in a all direction of the sintered cermet 1 measured by a 2D method is preferably a compressive stress of 150 MPa or more in the second hard phase 2*b* in the inside of the sintered cermet 1 and a compressive stress of 10 MPa or less in the second hard phase 2*b* in a surface portion of the sintered cermet 1. In this case, propagation of cracks formed on the surface can be effectively suppressed, and good chipping resistance can be obtained. Furthermore, since the residual stress hardly acts on the surface portion of the sintered cermet 1, deformation of the sintered cermet 1 is small and the sintered cermet 1 can also be applied to a rotary tool having a complicated shape.

In the present invention, a known hard film composed of TiN, TiCN, TiAlN, or Al2O3 may be deposited as a coating layer (not shown) on the surface of the sintered cermet by a known method for forming a thin film, e.g., physical vapor deposition (PVD) or chemical vapor deposition (CVD).

The tool of the present invention can be applied to throw-away tip-type turning tools, grooving tools, screw cutting tools, end mills, drills, solid end mills, solid drills, and the like.

An example of a rotary tool according to a second embodiment of the present invention will now be described. A description of the same configuration as that of the rotary tool of the first embodiment is omitted.

According to this embodiment, regarding a peak (denoted by Co (200) in the Figures) attributable to a (200) plane of the binding phase 3 in an X-ray diffraction pattern of the sintered cermet 1 described above, in (A) of FIGS. 2 3 and 4, a ratio ws/wi of a half-width ws of the peak attributable to a (200) plane of the binding phase 3 on the surface of the sintered cermet 1 to a half-width wi of the peak attributable to the (200) plane of the binding phase 3 in the inside of the sintered cermet 1 is 1.1 to 1.7. It was found that when the ratio is within this range, thermal shock resistance on the surface of the sintered cermet 1 is improved. The ratio ws/wi is preferably in the range of 1.2 to 1.5.

Here, when the peak of the binding phase 3 on the surface of the sintered cermet 1 was shifted, by 0.3 to 1.0 degree, to the high-angle side relative to the peak of the binding phase 3 inside the surface of the sintered cermet 1, deformation of the sintered cermet 1 due to firing was smaller. The amount of peak shift is preferably in the range of 0.4 to 0.6 degrees.

From the standpoint that wear resistance of the sintered cermet 1 can be increased while reducing deformation of the sintered cermet 1, preferably, the top surface layer 5 formed by exudation of the binding phase 3 on the surface is formed such that when an X-ray diffraction measurement is conducted on the surface of the sintered cermet 1, a ratio Ic/(Ia+Ib) of a peak intensity Ic of the peak of the binding phase 3 to the sum Ia+Ib of the peak intensity Ia of the peak on the low-angle side of the hard phase 2 and the peak intensity Ib of the peak on the high-angle side of the hard phase 2 is 0.5 to 1.4.

(Production Method)

Next, an example of a method for producing the sintered cermet of the first embodiment will be described.

First, a mixed powder is prepared by mixing a TiCN powder having an average particle diameter of 0.6 to 1.0 μm preferably 0.8 to 1.0 μm, at least one powder of a carbide, nitride, or carbonitride of aforementioned other metals of groups 4, 5, and 6 of the periodic table having an average particle diameter of 0.1 to 2 μm, at least one of a Co powder having an average particle diameter of 1.0 to 3.0 μm and a Ni powder having an average particle diameter of 0.3 to 0.8 μm, and as required, a MnCO3 powder having an average particle diameter of 0.5 to 10 μm. A TiC powder and a TiN powder may be added to the raw material, but these raw material powders constitute TiCN in the resulting sintered cermet after firing.

Next, a wax is added to the mixed powder, and granules having an average diameter of 10 to 200 μm are then prepared by a spray dryer method or the like. The granules are molded into a predetermined shape by press molding. In this step, when the average diameter of the granules is less than 10 μm, the compact has an uneven density, the amount of deformation during firing increases, and the specified surface region is not formed. On the other hand, when the average diameter of the granules exceeds 200 μm, adjacent uncrushed granules tend to remain in the compact, which may result in the formation of defects (voids), and the Ib/Ia ratio exceeds 1.5.

Next, according to this embodiment, a sintered cermet having the above-described specified structure can be prepared by firing the compact under the conditions below. The firing is conducted under the condition of: (a) increasing the temperature to 1,050° C. to 1,250° C. at a temperature-increasing rate of 5 to 15° C./min; (b) increasing the temperature to 1,330° C. to 1,380° C. at a temperature-increasing rate of 0.1 to 2° C./min in an atmosphere filled with 30 to 1,500 Pa of nitrogen (N); (c) increasing the temperature to 1,400° C. to 1,500° C. at a temperature-increasing rate of 4 to 15° C./min in an atmosphere filled with 30 to 1,500 Pa of nitrogen (N), and maintaining this state for 0.5 to 1.0 hour; (d) increasing the temperature to a high temperature of 1,550° C. to 1,600° C. at a temperature-increasing rate of 4 to 15° C./min in a nitrogen atmosphere, and maintaining the maximum temperature for 0.5 to 1.0 hour in a vacuum atmosphere; and then (e) conducting cooling at a cooling rate of 6 to 15° C./min in an inert gas atmosphere.

In this method, if step (c) is conducted in a vacuum atmosphere, the formation of a solid solution in the hard phase excessively proceeds, and the surface region of the sintered cermet is not formed. If step (c) is conducted in an atmosphere at a nitrogen pressure of more than 1,500 Pa, the formation of a solid solution in the hard phase is excessively suppressed, and the surface region of the sintered cermet is not formed. If the temperature-increasing rate in step (d) is less than 4° C./min, solid solution of group 4, 5, and 6 elements of the periodic table in the hard phase excessively occurs in a surface portion of the sintered cermet 2, and the (220) peaks in the X-ray diffraction pattern of the surface of the sintered cermet cannot be controlled to be in the specified range. If the temperature-increasing rate is more than 15° C./min, solid solution of group 4, 5, and 6 elements of the periodic table in the hard phase does not occur in a surface portion of the sintered cermet, and the surface region of the present invention cannot be obtained. Furthermore, if the temperatures in steps (c) and (d) are out of the specified ranges, the formation of a solid solution in the hard phase cannot be appropriately controlled and the surface region cannot be formed.

Next, a coating layer is deposited on the surface of the tip, as required. Physical vapor deposition (PVD) such as ion plating or sputtering can be suitably employed as the method for depositing the coating layer.

Next, a method for producing a cermet according to the second embodiment of the present invention will be described. A description of the same conditions as those of the first embodiment is omitted. A sintered cermet of the second embodiment can be prepared by firing a compact produced as in the first embodiment under the conditions below. The firing is conducted under the condition of: (a) increasing the temperature to 1,050° C. to 1,250° C. at a temperature-increasing rate of 5 to 15° C./min; (b) increasing the temperature to 1,330° C. to 1,380° C. at a temperature-increasing rate of 0.1 to 2° C./min in a vacuum atmosphere; (c) increasing the temperature to 1,500° C. to 1,600° C. at a temperature-increasing rate of 5 to 10° C./min in an atmosphere filled with nitrogen (N) at a pressure of 30 to 500 Pa; (d) changing the atmosphere to an atmosphere filled with nitrogen (N) at a pressure higher than the nitrogen pressure in step (c) above and 1,500 Pa or less, and maintaining this state for 0.5 to 1.0 hour; (e) changing again the atmosphere from the nitrogen atmosphere to a vacuum atmosphere, and maintaining this state for 0.5 to 1.0 hour; and then (f) conducting cooling to 1,000° C. to 1,100° C. in a vacuum atmosphere at a cooling rate of 5 to 10° C./min, and then conducting cooling in an inert gas atmosphere at a cooling rate of 5 to 15° C./min.

In this method, if step (c) is conducted in a vacuum atmosphere, the formation of a solid solution in the hard phase excessively proceeds, and the surface region of the sintered cermet is not formed. If step (c) is conducted in an atmosphere at a nitrogen pressure of more than 500 Pa, the formation of a solid solution in the hard phase is excessively suppressed, and the surface region of the sintered cermet is not formed. If the nitrogen pressure in the atmosphere in step (c) is the same as the nitrogen pressure in the atmosphere in step (d), the Ib/Ia ratio exceeds 1.5. If the temperature-increasing rate in step (c) is less than 5° C./min, solid solution of group 4, 5, and 6 elements of the periodic table in the hard phase excessively occurs on a surface of the sintered cermet 2, and the (220) peaks in the X-ray diffraction pattern of the surface of the sintered cermet cannot be controlled to be in the specified range. If the temperature-increasing rate is more than 10° C./min, solid solution of group 4, 5, and 6 elements of the periodic table in the hard phase does not occur on a surface of the sintered cermet, and the shift of the peak of the binding phase to the high-angle side in the present invention cannot be obtained.

Example 1

A mixed powder was prepared by mixing a TiCN powder having an average particle diameter (d50 value) of 0.6 μm, a WC powder having an average particle diameter of 1.1 μm, a TiN powder having an average particle diameter of 1.5 μm, a VC powder having an average particle diameter of 1.0 μm, a TaC powder having an average particle diameter of 2 μm, a MoC powder having an average particle diameter of 1.5 μm, a NbC powder having an average particle diameter of 1.5 μm, a ZrC powder having an average particle diameter of 1.8 μm, a Ni powder having an average particle diameter of 2.4 μm, a Co powder having an average particle diameter of 1.9 μm, and a MnCO3 powder having an average particle diameter of 5.0 μm in a mixing ratio shown in Table 1. All of these average particle diameters were measured by a micro-track method. Isopropyl alcohol (IPA) was added to the mixed powder, and wet mixing was conducted using a stainless steel ball mill and cemented carbide balls. Furthermore, 3% by mass of paraffin was added thereto and mixed. The resulting mixture was charged in an attritor mill, and granules having an average diameter shown in Table 1 were prepared by spray drying.

Subsequently, the granules were press-molded into the shape of a throw-away tip tool of CERATIP, Model No. BDMT11T308ER-JT, manufactured by KYOCERA Corporation by applying a pressure of 200 MPa. In step (a), the temperature was increased to 1,200° C. at a temperature-increasing rate of 10° C./min. In step (b), the temperature was increased to 1,350° C. at a temperature-increasing rate of 1° C./min. Subsequently, firing was conducted under the firing conditions shown in Table 2. In step (e), cooling was conducted in a nitrogen gas atmosphere at a cooling rate of 10° C./min. Thus, cermet throw-away tips of sample Nos. I-1 to I-8 were obtained.

TABLE 1

| Sample | Raw material composition (mass %) | | | | | | | | | | | Average diameter of granules |
|---|---|---|---|---|---|---|---|---|---|---|---|---|
| No. | TiCN | TiN | WC | TaC | MoC | NbC | ZrC | VC | Ni | Co | MnCO3 | (μm) |
| I-1 | Balance | — | 8 | — | 5 | 6 | 1 | — | 4 | 6 | — | 120 |
| I-2 | Balance | 6 | 10 | 6 | 4 | 4 | 0.2 | 1.5 | 5 | 7.5 | 1.0 | 90 |
| I-3 | Balance | 7 | 12 | 5 | — | 5 | — | 2.5 | 5 | 10 | 1.5 | 160 |
| I-4 | Balance | 10 | 10 | 4 | 5 | — | 0.1 | 1 | 3 | 9 | — | 50 |
| I-5 | Balance | 7 | 12 | 1 | 0 | 5 | 0.2 | 2.4 | 4 | 8 | 1 | 120 |
| I-6 | Balance | 8 | 6 | 2 | 5 | 10 | 0.5 | 0 | 6 | 7 | 0 | 80 |
| I-7 | Balance | 12 | 10 | 2 | 0 | 7 | 0.2 | 2 | 4 | 8 | 1 | 30 |
| I-8 | Balance | 5 | 11 | 5 | 2 | 9 | 0.3 | 1.3 | 6 | 7 | 0.5 | 250 |

TABLE 2

| | Step (c) | | | | | Step (d) | | | | |
|---|---|---|---|---|---|---|---|---|---|---|
| | Atmosphere during temperature increasing | | Temperature Increasing | Firing | Firing | Atmosphere during temperature increasing | | Temperature Increasing | Firing | Firing |
| Sample No. | Atmosphere | Pressure (Pa) | Rate (° C./min) | Temperature (° C.) | time (h) | Atmosphere | Pressure (Pa) | Rate (° C./min) | Temperature (° C.) | time (h) |
| I-1 | N2 | 1500 | 10 | 1400 | 0.5 | N2 | 700 | 6 | 1600 | 1 |
| I-2 | N2 | 1000 | 7 | 1500 | 0.5 | N2 | 1000 | 7 | 1575 | 0.5 |
| I-3 | N2 | 500 | 8 | 1450 | 0.5 | N2 | 1500 | 5 | 1575 | 0.5 |

TABLE 2-continued

| | Step (c) | | | | | | Step (d) | | | | | |
|---|---|---|---|---|---|---|---|---|---|---|---|---|
| | Atmosphere during temperature increasing | | Temperature Increasing | Firing | Firing | | Atmosphere during temperature increasing | | Temperature Increasing | Firing | Firing |
| Sample No. | Atmosphere | Pressure (Pa) | Rate (° C./min) | Temperature (° C.) | time (h) | | Atmosphere | Pressure (Pa) | Rate (° C./min) | Temperature (° C.) | time (h) |
| I-4 | N2 | 100 | 12 | 1500 | 1 | | N2 | 100 | 15 | 1550 | 0.8 |
| I-5 | Vacuum | | 5 | 1500 | 0.5 | | Vacuum | | 5 | 1600 | 1 |
| I-6 | N2 | 800 | 7 | 1550 | 1 | | N2 | 800 | 3.5 | 1600 | 1 |
| I-7 | N2 | 1800 | 7 | 1500 | 0.5 | | N2 | 1800 | 10 | 1550 | 0.5 |
| I-8 | N2 | 800 | 7 | 1450 | 0.5 | | N2 | 1000 | 8 | 1500 | 0.6 |

TABLE 3

| | SEM observation | | | | | | XRD peak | |
|---|---|---|---|---|---|---|---|---|
| | | Thickness of | Intermediate region | | Inner part | | Ib/Ia | |
| | Top | surface | First | Second | First | Second | | |
| Sample No. | surface layer | region (μm) | hard phase | hard phase | hard phase | hard phase | Surface region | Inside |
| I-1 | Not foromed | 2 | 1.0 | 2.3 | 0.8 | 1.2 | 0.52 | 0.42 |
| I-2 | Formed | 6 | 0.8 | 1.5 | 0.7 | 1.0 | 0.82 | 0.47 |
| I-3 | Formed | 5 | 0.7 | 1.4 | 0.8 | 1.1 | 0.92 | 0.53 |
| I-4 | Formed | 10 | 0.6 | 1.0 | 0.6 | 0.9 | 1.29 | 0.60 |
| I-5 | Not formed | Not formed | 1.1 | 2.5 | 0.8 | 1.1 | 0.16 | 0.35 |
| I-6 | Not formed | Not formed | 1.2 | 2.7 | 0.7 | 1.2 | 0.20 | 0.45 |
| I-7 | Formed | 6 | 0.7 | 1.3 | 0.7 | 1.1 | 2.86 | 0.34 |
| I-8 | Formed | 12 | 0.6 | 1.2 | 0.6 | 0.9 | 1.90 | 0.39 |

1) SEM observation: Regarding the intermediate region and the inner part, the average grain sizes (μm) of the hard phases are shown.

TABLE 4

| | | | Cutting performance | | |
|---|---|---|---|---|---|
| Sample | Residual stress (MPa) | | Perpendicularity | Wear resistance | Chipping resistance |
| No. | Surface | Inside | (μm) | (min) | (mm) |
| I-1 | −10 | −160 | 38 | 34 | 1360 |
| I-2 | 5 | −230 | 35 | 37 | 1590 |
| I-3 | 20 | −200 | 41 | 34 | 1520 |
| I-4 | 10 | −180 | 32 | 30 | 1480 |
| I-5 | −110 | −30 | 62 | 35 | 1040 |
| I-6 | −170 | −100 | 70 | 31 | 1080 |
| I-7 | 120 | −80 | 44 | 23 | 1150 |
| I-8 | 100 | −50 | 43 | 28 | 920 |

A flank face of each of the prepared sintered cermets was ground away 0.5 mm in a thickness direction to form a mirror surface. An X-ray diffraction analysis was then conducted under the conditions of a measurement range of 2θ=50° to 80° including 60° to 63°, with a radiation source of CuKα ray (Kα1 was removed), and using a crystal phase of TiCN (220) in the analysis. Thus, diffraction patterns of FIGS. 3 and 4 were obtained. As shown in FIG. 3, the X-ray diffraction patterns in the insides of the sintered cermets were substantially the same among No. I-2, No. I-7, and No. I-5. In contrast, as shown in FIG. 2, regarding the X-ray diffraction patterns on the surfaces of the sintered cermets, the peak intensities of two peaks attributable to the (220) plane of the hard phase were different among the samples. This peak intensity ratio of each sample was calculated. The results are shown in Table 3. Furthermore, a scanning electron micrograph was taken on a cross section including a surface of each sintered cermet, and a structure observation as shown in FIG. 1 was conducted. The states of structures of the top surface layer, the surface region, the intermediate region, and the inner part are shown in Table 3.

Next, for each of the prepared sintered cermets, in each of the surface region of a rake face in a thickness direction and an inner portion prepared by polishing away 1 mm from the rake face, a residual stress of the second hard phase was measured by a 2D method (apparatus: X-ray diffractometer, D8 DISCOVER with GADDS Super Speed, manufactured by Bruker AXS K. K., radiation source: CuKα, collimator diameter: 0.3 mmϕ, measured diffraction line: TiN (422) plane).

Furthermore, a cutting test was conducted using the prepared cermet cutting tools under the cutting conditions described below. These results are shown in Table 4.

(Evaluation of Wear Resistance)

Work material: SKD11

Cutting speed: 120 m/min

Feed: 0.12 mm/tooth

Cutting depth: 2.0 mm

Cutting condition: Dry method

Evaluation parameters: The time until the amount of wear reaches 0.2 mm, and the average (μm) of the perpendicularity of two corner cutting edges.

(Evaluation of Chipping Resistance)

Work material: SCM440H

Cutting speed: 150 m/min

Feed: 0.15 mm/tooth

Cutting depth: 3.0 mm

Cutting condition: Dry method

Evaluation parameter: The length (mm) of cut until chipping occurs

As shown in Tables 1 to 4, in each of sample No. 1-5, in which the atmosphere in steps (c) and (d) was a vacuum atmosphere, and sample No. 1-6, in which the firing temperature in step (c) was higher than 1,500° C., the surface region was not formed, chipping resistance decreased, and deformation of the sintered cermet was large and thus the dimensional accuracy such as perpendicularity in machining was low. In each of sample No. 1-7, in which the gas pressure exceeded 1,500 Pa, and sample No. 1-8, in which the average diameter of the granules for preparing the compact was more than 200 μm, the Ib/Ia ratio in the X-ray diffraction peaks of the sintered cermet exceeded 1.5 and wear resistance decreased.

In contrast, sample Nos. I-1 to I-4 each having the structure and the X-ray diffraction pattern within the ranges of the present invention exhibited good wear resistance and chipping resistance and had a good tool life.

Example 2

Compacts shown in Table 5 were prepared using the same method, materials, and additives as those used in Example 1. In step (a), the temperature was increased to 1,200° C. at a temperature-increasing rate of 10° C./min. In step (b), the temperature was increased to 1,350° C. at a temperature-increasing rate of 1° C./min. Subsequently, firing was conducted under the firing conditions shown in Table 6. Next, in step (f), cooling was conducted in a nitrogen gas atmosphere at a cooling rate of 10° C./min. Thus, cermet throw-away tips of sample Nos. II-1 to II-9 were obtained.

TABLE 5

| Sample | Raw material composition (mass %) | | | | | | | | | | | Average diameter of granules |
|---|---|---|---|---|---|---|---|---|---|---|---|---|
| No. | TiCN | TiN | WC | TaC | MoC | NbC | ZrC | VC | Ni | Co | MnCO3 | (mm) |
| II-1 | Balance | — | 11 | — | 5 | 6 | 1 | — | 4 | 6 | — | 120 |
| II-2 | Balance | 6 | 10 | 8 | 6 | 4 | 0.2 | 1.5 | 6 | 7 | 1.0 | 90 |
| II-3 | Balance | 7 | 12 | 3 | — | 8 | — | 2.5 | 5 | 10 | 1.5 | 160 |
| II-4 | Balance | 10 | 10 | 4 | 5 | — | 0.1 | 1 | 3 | 9 | — | 50 |
| II-5 | Balance | 9 | 15 | 1 | 0 | 10 | 0.2 | 2.4 | 4 | 8 | 1 | 120 |
| II-6 | Balance | 8 | 6 | 2 | 5 | 10 | 0.5 | 0 | 6 | 7 | 0 | 80 |
| II-7 | Balance | 12 | 10 | 2 | 0 | 7 | 0.2 | 2 | 4 | 8 | 1 | 30 |
| II-8 | Balance | 10 | 11 | 5 | 2 | 9 | 0.3 | 1.3 | 6 | 7 | 0.5 | 250 |
| II-9 | Balance | 10 | 10 | 4 | 5 | — | 0.1 | 1 | 3 | 9 | — | 50 |

TABLE 6

| | Step (c) | | | | Step (d) | | | |
|---|---|---|---|---|---|---|---|---|
| | Atmosphere during temperature increasing | | Temperature Increasing | Firing | Atmosphere during temperature increasing | | Holding | Step (e) Firing |
| Sample No. | Atmosphere | Pressure (Pa) | Rate (° C./min) | Temperature (° C.) | Atmosphere | Pressure (Pa) | Temperature (° C.) | time (h) |
| II-1 | N2 | 100 | 6 | 1525 | N2 | 700 | 0.3 | 1 |
| II-2 | N2 | 500 | 7 | 1575 | N2 | 1000 | 0.5 | 0.5 |
| II-3 | N2 | 500 | 5 | 1575 | N2 | 1500 | 0.5 | 0.5 |
| II-4 | N2 | 100 | 10 | 1550 | N2 | 1000 | 0.5 | 0.8 |
| II-5 | Vacuum | | 5 | 5 | Vacuum | | 0.5 | 0.5 |
| II-6 | N2 | 400 | 3.5 | 1600 | N2 | 800 | 1 | 1 |
| II-7 | N2 | 1800 | 10 | 1575 | N2 | 1800 | 0.5 | 0.5 |
| II-8 | N2 | 500 | 8 | 1550 | N2 | 1000 | 0.5 | 0.6 |
| II-9 | N2 | 100 | 15 | 1550 | N2 | 100 | 1 | 0.8 |

TABLE 7

| | SEM observation | | | | | | XRD peak | | | | |
|---|---|---|---|---|---|---|---|---|---|---|---|
| | | Thickness of | Intermediate region | | Inner part | | | | peak of binding | | |
| | Top | surface | First | Second | First | Second | Ib/Ia | | phase | | |
| Sample No. | surface layer | region (μm) | hard phase | hard phase | hard phase | hard phase | Surface region | Inside | Peak shift | ws/wi | Ic/(Ia + Ib) |
| II-1 | Formed | 2 | 0.8 | 1.8 | 0.8 | 1.2 | 0.90 | 0.42 | 0.45 | 1.18 | 1.14 |
| II-2 | Formed | 4 | 0.8 | 1.5 | 0.6 | 1.0 | 0.81 | 0.47 | 0.51 | 1.33 | 0.85 |

TABLE 7-continued

| | | SEM observation | | | | | XRD peak | | | | |
|---|---|---|---|---|---|---|---|---|---|---|---|
| | | Thickness of | Intermediate region | | Inner part | | | | peak of binding | | |
| | Top | surface | First | Second | First | Second | Ib/Ia | | phase | | |
| Sample No. | surface layer | region (μm) | hard phase | hard phase | hard phase | hard phase | Surface region | Inside | Peak shift | ws/wi | Ic/(Ia + Ib) |
| II-3 | Formed | 5 | 0.7 | 1.3 | 0.8 | 1.0 | 0.97 | 0.52 | 0.28 | 1.11 | 0.79 |
| II-4 | Not formed | 8 | 1 | 2.1 | 0.5 | 0.9 | 0.85 | 0.60 | 0.73 | 1.47 | 0.53 |
| II-5 | Not formed | Not formed | 1.1 | 2.1 | 0.6 | 1.1 | 0.14 | 0.33 | 0.23 | 1.08 | 0.21 |
| II-6 | Not formed | Not formed | 1.3 | 2.9 | 0.7 | 1.2 | 0.35 | 0.44 | 0.16 | 1.18 | 0.30 |
| II-7 | Formed | 6 | 0.7 | 1.3 | 0.6 | 1.1 | 2.86 | 0.34 | 0.62 | 0.70 | 1.52 |
| II-8 | Formed | 10 | 0.5 | 1.1 | 0.6 | 1.0 | 1.65 | 0.38 | 0.44 | 0.90 | 0.67 |
| II-9 | Formed | 10 | 0.6 | 1.0 | 0.5 | 0.9 | 1.29 | 0.60 | 0.54 | 0.96 | 1.52 |

1) SEM observation: Regarding the intermediate region and the inner part, the average grain sizes (μm) of the hard phases are shown.

TABLE 8

| | | | Cutting performance | | |
|---|---|---|---|---|---|
| Sample | Residual stress (MPa) | | Perpendicularity | Wear resistance | Chipping resistance |
| No. | Surface | Inside | (μm) | (min) | (mm) |
| II-1 | 10 | −200 | 32 | 41 | 1680 |
| II-2 | 5 | −210 | 35 | 45 | 1800 |
| II-3 | 20 | −160 | 42 | 33 | 1510 |
| II-4 | −10 | −180 | 38 | 40 | 1590 |
| II-5 | −150 | −5 | 60 | 29 | 1020 |
| II-6 | −160 | −10 | 71 | 32 | 1090 |
| II-7 | 150 | −80 | 44 | 23 | 1150 |
| II-8 | 120 | −50 | 37 | 26 | 980 |
| II-9 | −10 | −100 | 32 | 30 | 1480 |

For each of the prepared sintered cermets, the peak intensity ratio, the states of structures of the top surface layer, the surface region, the intermediate region, and the inner part were examined as same as Example 1. The results are shown in Table 7. The residual stresses of the sintered cermets were measured. The results are shown in Table 8.

Furthermore, a cutting test was conducted using the cermet cutting tools under the same cutting conditions as Example 1. The results are also shown in Table 8.

As shown in Tables 5 to 8, in each of sample No. 11-5, in which the atmosphere in steps (c) and (d) was a vacuum atmosphere, and sample No. 11-6, in which the firing temperature in step (c) was higher than 1,500° C., the surface region was not formed, chipping resistance decreased, and deformation of the sintered cermet was large and thus the dimensional accuracy such as perpendicularity in machining was low. In each of sample No. II-7, in which the gas pressure exceeded 1,500 Pa, and sample No. II-8, in which the average diameter of the granules for preparing the compact was more than 200 μm, the Ib/Ia ratio in the X-ray diffraction peaks of the sintered cermet exceeded 1.5 and wear resistance decreased. Furthermore, in sample No. II-9, in which the nitrogen gas pressure in step (d) was the same as the nitrogen gas pressure in step (c), the ratio (ws/wi) was smaller than 1.1 and chipping resistance was low.

In contrast, sample Nos. II-1 to II-4 each having the structure and the X-ray diffraction pattern within the ranges of the present invention and having a ratio (ws/wi) of 1.1 to 1.7 exhibited good wear resistance and chipping resistance and had a good tool life.

| REFERENCE NUMERALS | |
|---|---|
| 1 | sintered cermet |
| 2 | hard phase |
| 2a | first hard phase |
| 2b | second hard phase |
| 3 | binding phase |
| 4 | surface region |
| 5 | top surface layer |
| 6 | inner part |
| 7 | intermediate region |

The invention claimed is:

1. A rotary tool comprising a sintered cermet, said sintered cermet comprising:

a hard phase comprising a carbide, a nitride, and a carbonitride of at least one of group 4, 5, and 6 metals of the periodic table of which metals the metal titanium is a main component; and a binding phase comprising at least one of Co and Ni; wherein the hard phase further comprises:

a first hard phase in which a content of Ti is the highest among contents of the at least one of group 4, 5, and 6 metals of the periodic table; and a second hard phase having a higher content ratio of a content of the at least one of group 4, 5, and 6 metals of the periodic table other than Ti than the content ratio in the first hard phase; wherein the result of an X-ray diffraction measurement on a surface of the sintered cermet provides a first peak intensity Ib on a high angle side that is attributable to a (220) plane of the first hard phase and a second peak intensity Ia on a low angle side that is attributable to a (220) plane of the second hard phase, and an intensity ratio Ib/Ia of the first peak intensity Ib the second peak intensity Ia is in the range of 0.5 to 1.5; and a ratio ws/wi of a half-width ws of a third peak intensity lc attributable to a (200) plane of the binding phase on the surface of the sintered cermet to a half-width wi of a fourth peak intensity attributable to a (200) plane of the binding phase on an inside of the sintered cermet of the binding phase measured inside of the sintered cermet is in a range of 1.18 to 1.7.

2. The rotary tool according to claim 1, wherein the third peak intensity is by 0.3 to 1.0 degrees more on the high-angle side in comparison to the fourth peak intensity.

3. The rotary tool according to claim 1, further comprising a surface region that mainly comprises the first hard phase and has a thickness range of 1 to 10 μm.

4. The rotary tool according to claim 3, further comprising a top surface layer comprising a higher concentration of the binding phase than a concentration of the binding phase deeper inside the sintered cermet.

5. The rotary tool according to claim 4, wherein a ratio Ic/(Ia+Ib) of the third peak intensity Ic to the sum Ia+Ib of the first and second peak intensities is in a range of 0.5 to 1.4.

6. The rotary tool according to claim 1, wherein a residual stress in the second hard phase in a σ11 direction of the sintered cermet measured by a 2D method is a compressive stress of 150 MPa or more at a location inside of the sintered cermet and a compressive stress of 10 MPa or less in the second hard phase in a surface portion of the sintered cermet.

* * * * *

UNITED STATES PATENT AND TRADEMARK OFFICE

CERTIFICATE OF CORRECTION

PATENT NO. : 8,808,871 B2
APPLICATION NO. : 13/512301
DATED : August 19, 2014
INVENTOR(S) : Hideyoshi Kinoshita and Katsuhiro Hanaki It is certified that error appears in the above-identified patent and that said Letters Patent is hereby corrected as shown below:

In the Specification

Column 5, line 9, delete “all” and write “σ11” in place thereof.

Figure 3:
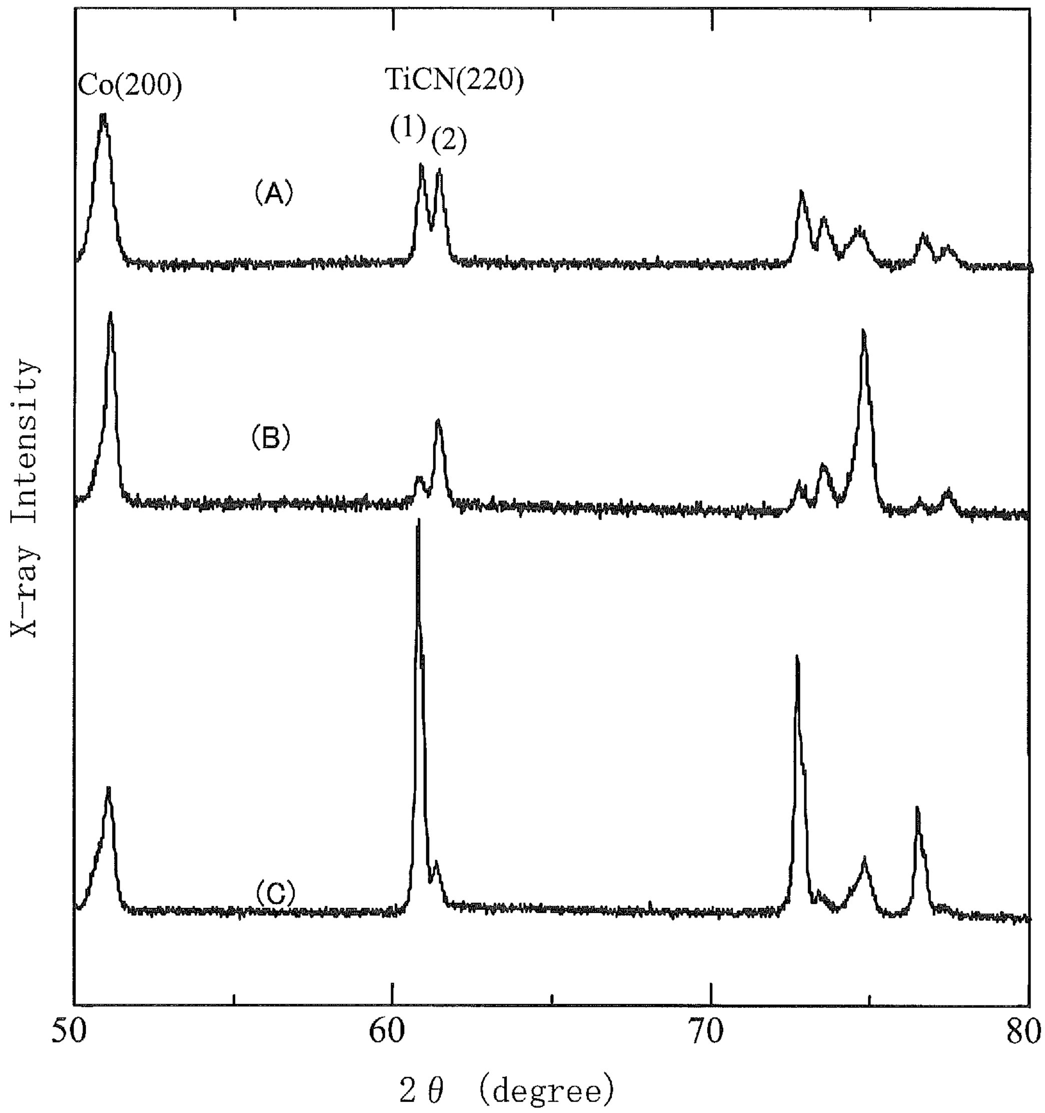
FIG. 3 shows X-ray diffraction patterns of the surfaces of an embodiment of the sintered cermets in FIG. 1.
Figure 4:
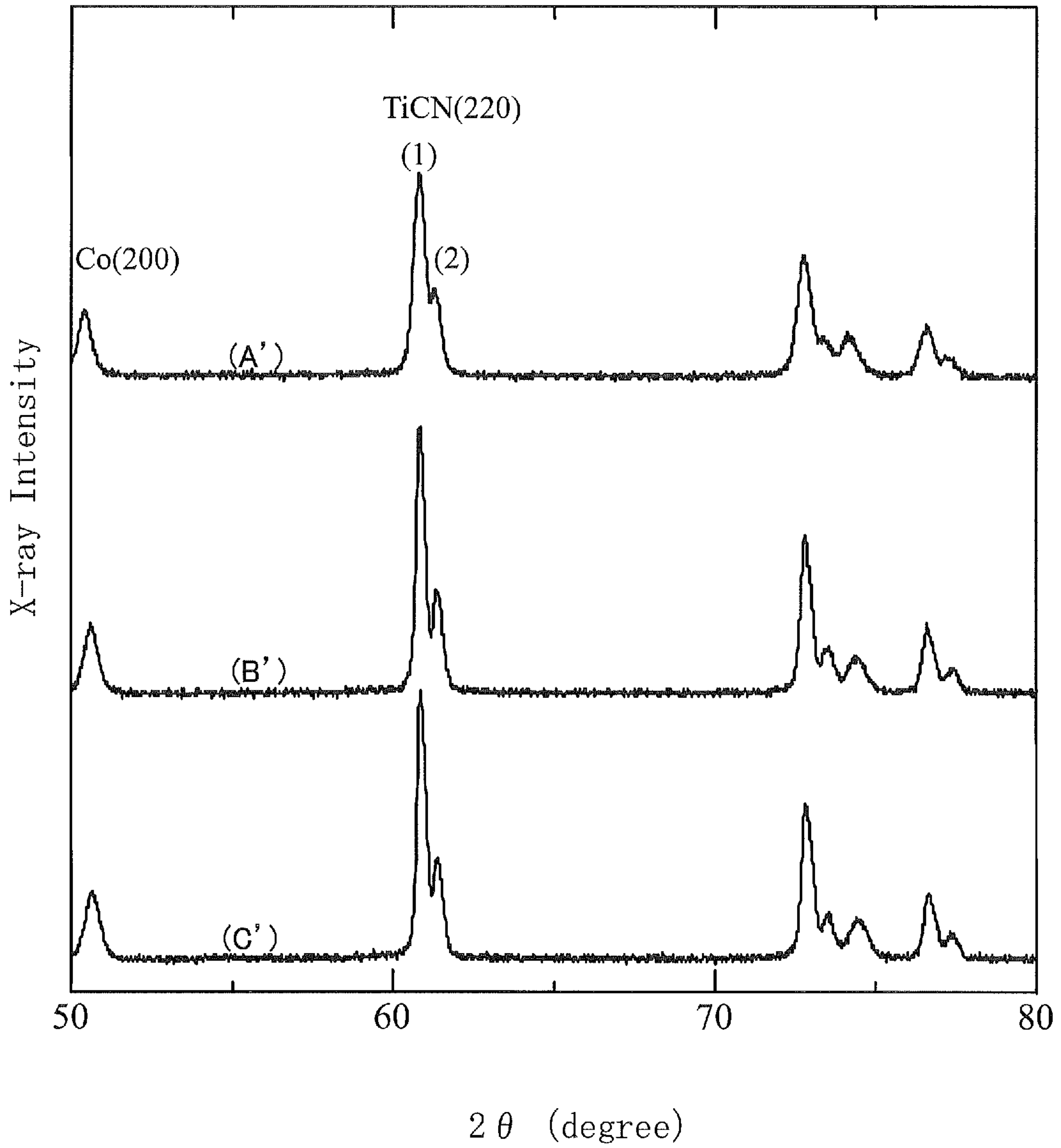
FIG. 4 shows X-ray diffraction patterns of the insides (polished surfaces prepared by polishing each of the sintered cermets by 1 mm from the surface) of and embodiment of the sintered cermets in FIGS. 1 and 2.

Column 5, line 37, delete “FIGS. 2 3” and write “FIGS. 3” in place thereof.

In the Claims

Column 14, line 61, delete “lc” and write “Ic” in place thereof.

Signed and Sealed this
Twenty-eighth Day of April, 2015

Michelle K. Lee

Michelle K. Lee
*Director of the United States Patent and Trademark Office*